US006650715B1

(12) United States Patent
Kim et al.

(10) Patent No.: US 6,650,715 B1
(45) Date of Patent: Nov. 18, 2003

(54) APPARATUS FOR RECOVERING DECISION-DIRECTED CARRIER

(75) Inventors: Myung Sup Kim, Daejeon (KR); Yun Jeong Song, Daejeon (KR); Seong Pal Lee, Daejeon (KR); Jong Suk Chae, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 09/183,881

(22) Filed: Oct. 30, 1998

(30) Foreign Application Priority Data

Aug. 26, 1998 (KR) ........................................... 98/34557

(51) Int. Cl.[7] ............................................... H04L 27/06
(52) U.S. Cl. ....................................... 375/344; 329/306
(58) Field of Search ................................ 375/316, 340, 375/344, 326; 329/306–309

(56) References Cited

U.S. PATENT DOCUMENTS 5,282,228 A * 1/1994 Scott et al. ................. 375/344

OTHER PUBLICATIONS

M.P. Fitz, Equivocation in Nonlinear Digital Carrier Synchronizers, IEEE Trans. On Comm., vol. COM–39, No. 11, Nov. 1991.

M.P. Fitz, W.C. Lindsey, Decision–Directed Burst–Mode Carrier Synchronization Techniques, IEEE Trans. On Comm., vol. COM–40, No. 10, Oct. 1992.

Andrew J. Viterbi, et al., Nonlinear Estimation of PSK–Modulated Carrier Phase with Application To Burst Digital Transmission.

* cited by examiner

*Primary Examiner*—Chi Pham
*Assistant Examiner*—Pankaj Kumar
(74) *Attorney, Agent, or Firm*—Cohen, Pontani, Lieberman & Pavane

(57) ABSTRACT

An apparatus for recovering a decision-directed carrier according the present invention comprises a) a first conjugate complex sample generating part for generating a first conjugate complex sample in accordance with an received complex sample; b) a frequency recovering part for receiving the first conjugate complex sample and for recovering a carrier frequency of the first conjugate complex sample by compensating a carrier frequency offset of the input signal; c) a phase recovering part for receiving the first conjugate complex sample and for recovering a carrier phase of the input signal by compensating a carrier phase offset of the input signal; and d) a symbol decison part for selecting a symbol in accordance with the output value from said means c) and for outputting the selected symbol to said means a).

4 Claims, 1 Drawing Sheet

INPUT SIGNAL
120
121
DELAYER
122
123
PHASE OFFSET DETECTOR
124
CONJUGATE COMPLEX SAMPLE GENERATING PART
125
130
131
DELAYER
132
DELAYER
133
134
PHASE OFFSET DETECTOR
135
CONJUGATE COMPLEX SAMPLE GENERATING PART
136
137
DELAYER
140
SYMBOL DECISION PART
110
CONJUGATE COMPLEX SAMPLE GENERATING PART

APPARATUS FOR RECOVERING DECISION-DIRECTED CARRIER

BACKGROUND OF THE INVENTION

1. Technical Field of the Invention

The present invention relates to an apparatus for recovering carrier, particularly relates to an apparatus for recovering decision-directed carrier of which baseband signal is processed in complex domain.

2. Description of the Prior Art

In a general demodulator of digital radio communication system, carrier recovery means the compensation of carrier frequency offset and phase offset contained in sample data in order to decide symbol data.

Carrier contained in a received signal is removed by a local oscillator in an intermediate frequency converter through a radio frequency receiving part. Even though the carrier is removed, there are the frequency offset and the phase offset of the carrier. Therefore, the frequency offset and the phase offset are detected and compensated in the baseband in order to simply implement demodulator.

In satellite communication, since high frequency is used for the intermediate and the radio frequency, the received signal is much affected by the frequency shift when bandwidth of transmission signal is narrow. When a narrow band signal such as voice signal is transmitted, the received signal is to be shifted by multiple numbers of the bandwidth. Therefore, there needs a frequency synthesizer which converts the received signal to an appropriate baseband signal.

Wide band satellite communication is not much affected by frequency shift. For example, in a satellite communication which transmits the signal having transmission rate more than 45 Mbps by Quadrature Phase Shift Keying (QPSK), if frequency shift is within 5000 PPM(Particles Per Million), the frequency shift may be under the control by using an accurate frequency oscillator.

Some methods have been proposed in order to improve carrier recovery performance.

In 1983, A. J. Viterbi and A. M. Viterbi proposed Mth Powering Algorithm (hereinafter, which is referred to "V&V algorithm") for detecting carrier phase for MPSK (M-ary Phase Shift Keying) signal (See, A. J. Viterbi and A. M. Viterbi, 'Nonlinear Estimation of PSK Modulation Carrier Phase with Application to Burst Digital Communication', IEEE Trans. Infor. Theory, vol. IT-32, July 1983). However, the V&V algorithm has a shortcoming that noise to signal considerably increases when M increases.

In 1991, Fitz analyzed vagueness of V&V algorithm and proposed solution (See, M. P. Fitz, 'Equivocation in nonlinear digital carrier synchronizers', IEEE Trans. On Comm., Vol. COM-39, No.11, November 1991).

Classen proposed a decision-directed method and the analyzed performance of the method (See, F. Classen, H. Meyer and P. Sehier, 'An all feedforward synchronization unit for digital radio', Proc. of VTC'93, 1993). In Classen's method, though VCO (Voltage Controlled Oscillator) is not used, ROM is used in order to represent the detected carrier phase by complex value.

Also, Fitz proposed a decision-directed burst mode carrier synchronization techniques applicable to TDMA (See, M. P. Fitz, 'Dicision-Directed Burst-Mode Carrier Synchronization Techniques', IEEE Trans. On Comm., Vol. COM-40, No.10, October 1992). This Fitz's technique needs a divider in order to detect carrier frequency instead of VCO. Using the Fitz's technique, frequency recovery may be obtained in broad range; however, it is difficult for high speed communication to use the divider, thereby being unsuitable to perform the frequency recovery.

SUMMARY OF THE INVENTION

Therefore, an object of the present invention is to provide a decision-directed carrier recovering apparatus which is apt for high rate satellite communication and rapidly recovers carrier phase and carrier frequency by processing baseband signals in complex domain.

According to the first aspect of the present invention, this object is accomplished by providing an apparatus for recovering carrier of an input signal from outside, the apparatus comprising: a) means for generating a first conjugate complex sample in accordance with a received complex sample; b) means for receiving the first conjugate complex sample and for recovering a carrier frequency of the first conjugate complex sample by compensating a carrier frequency offset of the input signal; c) means for receiving the first conjugate complex sample and for recovering a carrier phase of the input signal by compensating a carrier phase offset of the input signal; and d) means for selecting a symbol in accordance with output value from said means c) and for outputting the selected symbol to said means a).

BRIEF DESCRIPTION OF THE DRAWINGS

Other objects and aspects of the invention will become apparent from the following description of the embodiments with reference to the accompanying drawing in which.

DETAILED DESCRIPTION OF THE PREFERRED EMBODIMENTS

Figure 1:
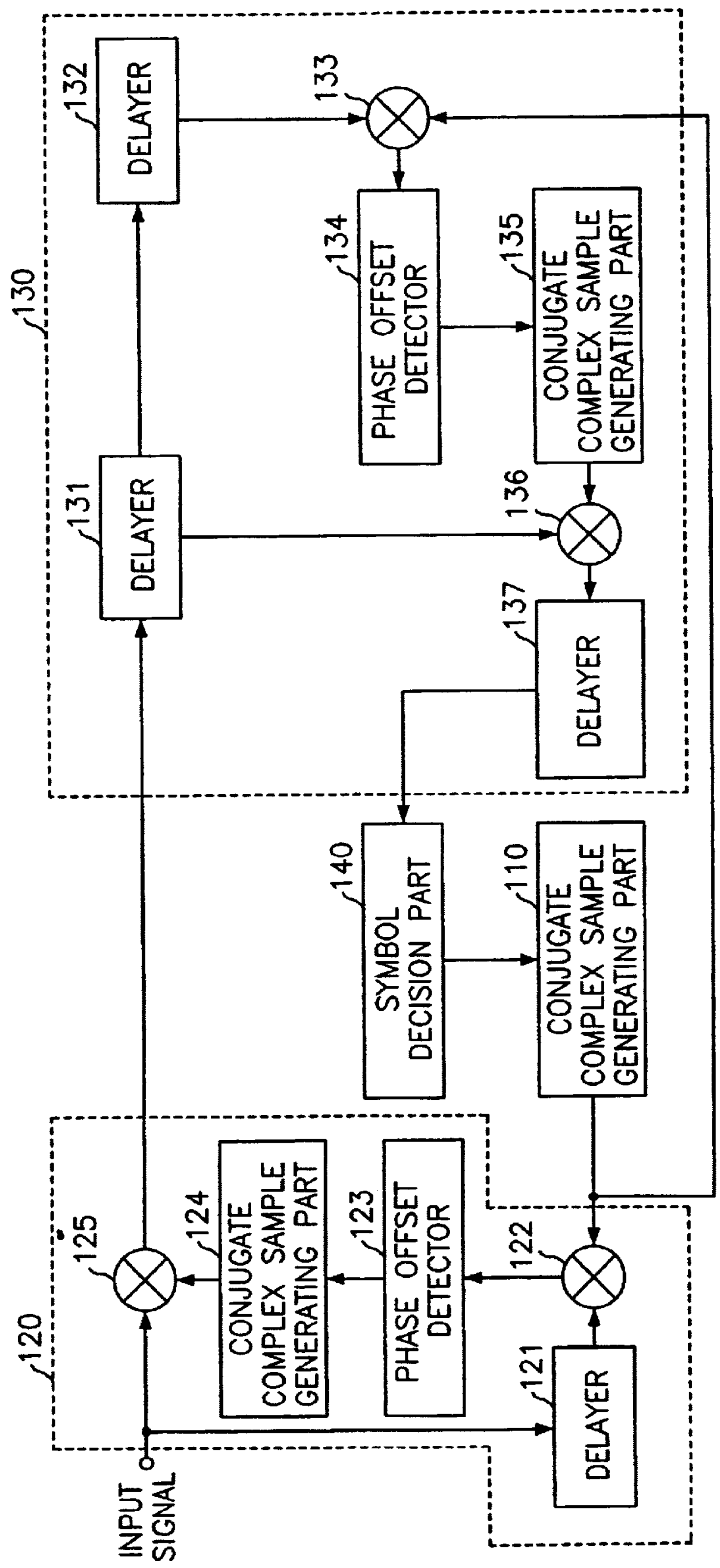
FIG. 1 is a block diagram of the decision-directed carrier recovering apparatus in accordance with the present invention.

The embodiments of the present invention will be described with reference to the accompanying drawings.

FIG. 1 shows a block diagram of the decision-directed carrier recovering apparatus in accordance with the present invention.

Referring FIG. 1, the decision-directed carrier recovering apparatus comprises a conjugate complex sample generating part 110, a frequency recovering part 120, a phase recovering part 130 and a symbol decision part 140.

The conjugate complex sample generating part 110 receives a complex sample and outputs a conjugate complex sample of the complex sample.

The frequency recovering part 120 receives the conjugate complex sample from the conjugate complex sample generating part 110 and recovers a decision-directed carrier frequency by compensating carrier frequency offset of an input signal from outside. The frequency recovering part 120 comprises a delayer 121, multipliers 122 and 125, a phase offset detector 123 and a conjugate complex sample generating part 124.

The delayer 121 delays the input signal from outside. The multiplier 122 multiplies the delayed signal from the delayer 121 by a conjugate complex sample from the conjugate complex sample generating part 110. The frequency offset detector 123 detects a frequency offset from an output signal of the multiplier 122. The conjugate complex sample generating part 124 receives the detected frequency offset signal from the frequency offset detector 123 and outputs the conjugate complex sample. The multiplier 125 multiplies the carrier of the input signal from outside by a conjugate complex sample from the conjugate complex sample generating part 124 and outputs the result to the phase recovering part 130.

The phase offset detector 123 may be implemented by a low pass filter which filters the output signal of the multiplier 122 and detects frequency offset.

The phase recovering part 130 receives a conjugate complex sample from the conjugate complex sample generating part 110 and recovers phase offset of the output signal of the frequency recovering part 120. The phase recovering part 120 comprises a plurality of delayers 131, 132 and 137, multipliers 133 and 136, a phase offset detector 134 and a conjugate complex sample generating part 135.

The delayer 131 and 132 respectively delay the output signal of the multiplier 125 and the delayer 131. The multiplier 133 multiplies a conjugate complex sample from the conjugate complex sample generating part 110 by the output signal of the delayer 132. The phase offset detector 134 detects phase offset of the output signal of the multiplier 133. The conjugate complex sample generating part 135 receives a output signal of the phase offset detector 134 and outputs the conjugate complex sample. The multiplier 136 multiplies the output signal of the delayer 131 by the output signal of the conjugate complex sample generating part 135. The delayer 137 delays the output signal of the multiplier 136 and outputs the delayed signal to the symbol decision part 140.

The phase offset detector 134 may be implemented by a low pass filter which filters the output signal of the multiplier 133 and detects phase offset.

The symbol decision part 140 selects a complex sample apt for a value of the output signal of the phase recovering part 130 and outputs the selected complex sample to the conjugate complex sample generating part 110.

Operations of the decision-directed carrier recovering apparatus as described above will be explained.

The frequency recovering part 120 is a frequency tracking loop and recovers a decision-directed carrier frequency by compensating carrier frequency offset of an input signal from outside.

An input signal from an outside is delayed for a certain time by the delayer 121 and transferred to the multiplier 122. The multiplier 122 multiplies the delayed carrier signal from the delayer 121 by a conjugate complex sample from the conjugate complex sample generating part 110 and outputs the result to the frequency offset detector 123.

The frequency offset detector 123 implemented by a low pass filter filters the output signal of the multiplier 122, detects frequency offset and outputs the detected frequency offset to the conjugate complex sample generating part 124. Here, the frequency offset is represented by a complex sample.

Receiving a detected frequency offset signal from the frequency offset detector 123, the conjugate complex sample generating part 124 converts representation form of the frequency offset from the complex sample to the conjugate complex sample and outputs the conjugate complex sample to the multiplier 125.

The multiplier 125 multiplies the carrier of the input signal from outside by a conjugate complex sample from the conjugate complex sample generating part 124 and outputs the result to the delayer 131 of the phase recovering part 130.

The phase recovering part 130 is a phase tracking loop and recovers phase offset of the output signal of the frequency recovering part 120.

The signal of which frequency is recovered by the frequency recovering part 120 is delayed by the delayer 131. The delayed signal is transferred to the delayer 132 and the multiplier 136. The delayed signal from the delayer 132 is multiplied by the conjugate complex sample from the conjugate complex sample generating part 110 by the multiplier 133.

The phase offset detector 134 implemented by a low pass filter filters the output signal of the multiplier 133, detects a phase offset and outputs the detected phase offset to the conjugate complex sample generating part 134. Here, the frequency offset is represented by a complex number.

Receiving a detected frequency offset signal from the phase offset detector 134, the conjugate complex sample generating part 135 converts representation form of the phase offset from the complex sample to the conjugate complex sample and outputs the conjugate complex sample to the multiplier 136.

After detecting the carrier phase offset of the input signal, the multiplier 136 multiplies the output signal of the delayer 131 by the phase offset from the conjugate complex sample generating part 135 and outputs the multiplication result to the delayer 137.

Receiving the signal delayed by the delayer 137 for a certain time, the symbol decision part 140 compares the delayed signal with a pre-determined reference signal, selects a complex sample in accordance with the comparison result and outputs the selected complex sample to the conjugate complex sample generating part 110.

The phase offset detector 134 may be implemented by a low pass filter which filters the output signal of the multiplier 133 and detects phase offset.

The symbol decision part 140 selects a symbol apt for a value of the output signal of the phase recovering part 130 and outputs the selected symbol to the conjugate complex sample generating part 110.

Operation of the decision-directed carrier recovering apparatus as described above will be explained by equations.

The carrier $x_k$ of the input signal to MPSK signal from outside is expressed as equation 1.

$$x_k=e^{j(\omega_0 k+\theta)}d_k+n_k \tag{1}$$

Where, $\omega_0$ is a frequency offset, $\theta_0$ is a carrier phase in range $[-\pi, \pi]$, $d_k \epsilon\{e^{j2\pi\perp/M}\ |l=0,1, \ldots, M-1\}$ is data symbols, $n_k$ is a White Gaussian Noise having $N_0/2$ double-sided Power Spectrum Density.

The output signal from the multiplier 122 for detecting frequency offset can be expressed as equation 2.

$$\hat{e}_{w,k}=x_k\hat{d}_k{}^* \tag{2}$$

The output signal from the multiplier 133 for detecting phase offset can be expressed as equation 3.

$$\hat{e}_{\theta,k}=x_k\hat{d}_k{}^* \tag{3}$$

Where, $y_k$, which is the output value of the multiplier 125, refers to input sample of which the detected frequency offset is compensated. The equation 2 represents a new frequency offset detector for compensating frequency offset. The frequency offset detector detects frequency offset by using only one sample for each symbol. If we assume that symbol decision is always correct, the frequency offset detector 123 is represented by the expectation value of the equation 2 and can be written as equation 4.

$$\hat{\Omega}_k = E(x_k \hat{d}_k^*) = E(d_k \hat{d}_k^* e^{j(\omega_0 k+\theta_0)} + n_k \hat{d}_k^*) = e^{j(\omega_0 k+\theta_0)} \quad (4)$$

Here, since the symbol decision is assumed to be correct, the frequency recovering part is not used by time k. Therefore, $e^{j\omega_0}$, which is a phase required for compensating frequency offset contained in a next sample $x_{k+1}$, remains undecided. After obtaining expectation value in equation 3 for compensating phase offset, phase offset detection value of the phase offset detector 134 may be obtained by equation 5.

$$\hat{\Phi}_k = E(y_k \hat{d}_k^*) = E(x_l \hat{d}_k^* \hat{\Omega}_{k-1}^*) = E(d_k \hat{d}_k^* e^{j(\omega_0 k+\theta_0)} e^{-j(\omega_0 (k-1)+\theta_0)} + n_k \hat{d}_k^*) = e^{j\omega_o} \quad (5)$$

Where, the phase recovering part 130 is affected by no phase offset and by the frequency offset. The output signal of the multiplier 136 containing both of the phase offset and the frequency offset may be written by equation 6.

$$\hat{R}_{k+1} = \hat{\Omega}_k \hat{\Phi}_k = e^{j(\omega_0 k+\theta_0)} e^{j\omega_0} = e^{j(\omega_0 k+1)+\theta_0)} \quad (6)$$

Here, since the output signal of the multiplier 136 includes both of the phase offset and the frequency offset as written by the equation 6, the phase offset and the frequency offset included in the next input sample $x_{k+1}$ are detected and compensated.

The decision-directed carrier recovering apparatus recovers carriers by processing the baseband signal in the complex domain without using the existing voltage controlled oscillator and the divider. Therefore, the invention is implemented by simple circuit and considerably decreases noise from complex constitution of circuit. Also, this invention can be used for a high speed satellite communication.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for recovering carrier of an input signal from outside, the apparatus comprising:

a) means for generating a first conjugate complex sample in accordance with an received complex number;

b) means for receiving the first conjugate complex sample and for recovering a carrier frequency of the first conjugate complex sample by compensating a carrier frequency offset of the input signal;

c) means for receiving the first conjugate complex sample and for recovering a carrier phase of the input signal by compensating a carrier phase offset of the input signal; and d) means for selecting a symbol in accordance with the output value from said means c) and for outputting the selected symbol to said means a), wherein the means b) includes:

a second delay means for delaying the output signal of said first delay means;

a first multiplier for multiplying the first conjugate complex sample by the output signal of said second delay means;

a phase offset detecting means for detecting a phase offset from the output signal of said first multiplier;

a means for generating a second conjugate complex sample;

a second multiplier for multiplying the output signal of said first delay means by the second conjugate complex sample; and a third delay means for delaying and outputting the outputting the output signal of second multiplier to said means c).

2. An apparatus as claimed in claim 1, wherein said means b) comprises:

delay means for the carrier of the input signal;

a first multiplier for multiplying the delayed signal from the delay means by the first conjugate complex sample;

a frequency offset detecting means for detecting a frequency offset from an output signal of the first multiplier;

a means for generating a second conjugate complex sample; and a second multiplier for multiplying the carrier of the input signal by the second conjugate complex sample.

3. An apparatus as claimed in claim 2, wherein said frequency offset detecting means comprises a low pass filter for filtering the output signal of said first multiplier and for extracting the frequency offset.

4. An apparatus as claimed in claim 1, wherein said phase offset detecting means comprises a low pass filter for filtering the output signal of said second multiplier and for extracting the phase offset.

* * * * *